(No Model.) 2 Sheets—Sheet 2.
G. BEEKMAN.
REAPING OR MOWING MACHINE.
No. 553,095. Patented Jan. 14, 1896.
Fig. 4.
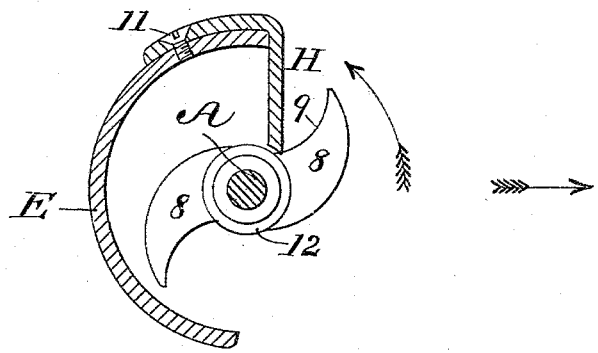
Fig. 5.
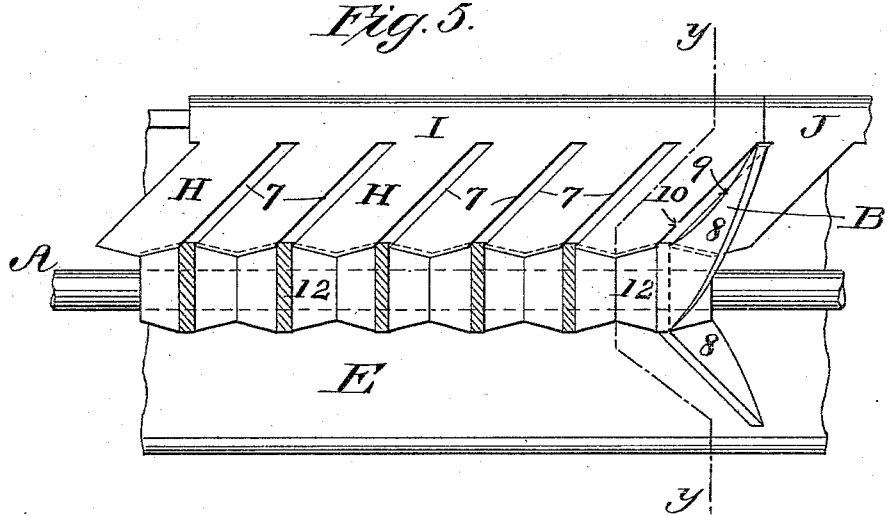
WITNESSES:
K. M. Tucker
Eugene Lucas
INVENTOR
Gerard Beekman
BY Henry F. Parker
ATTORNEY

UNITED STATES PATENT OFFICE.

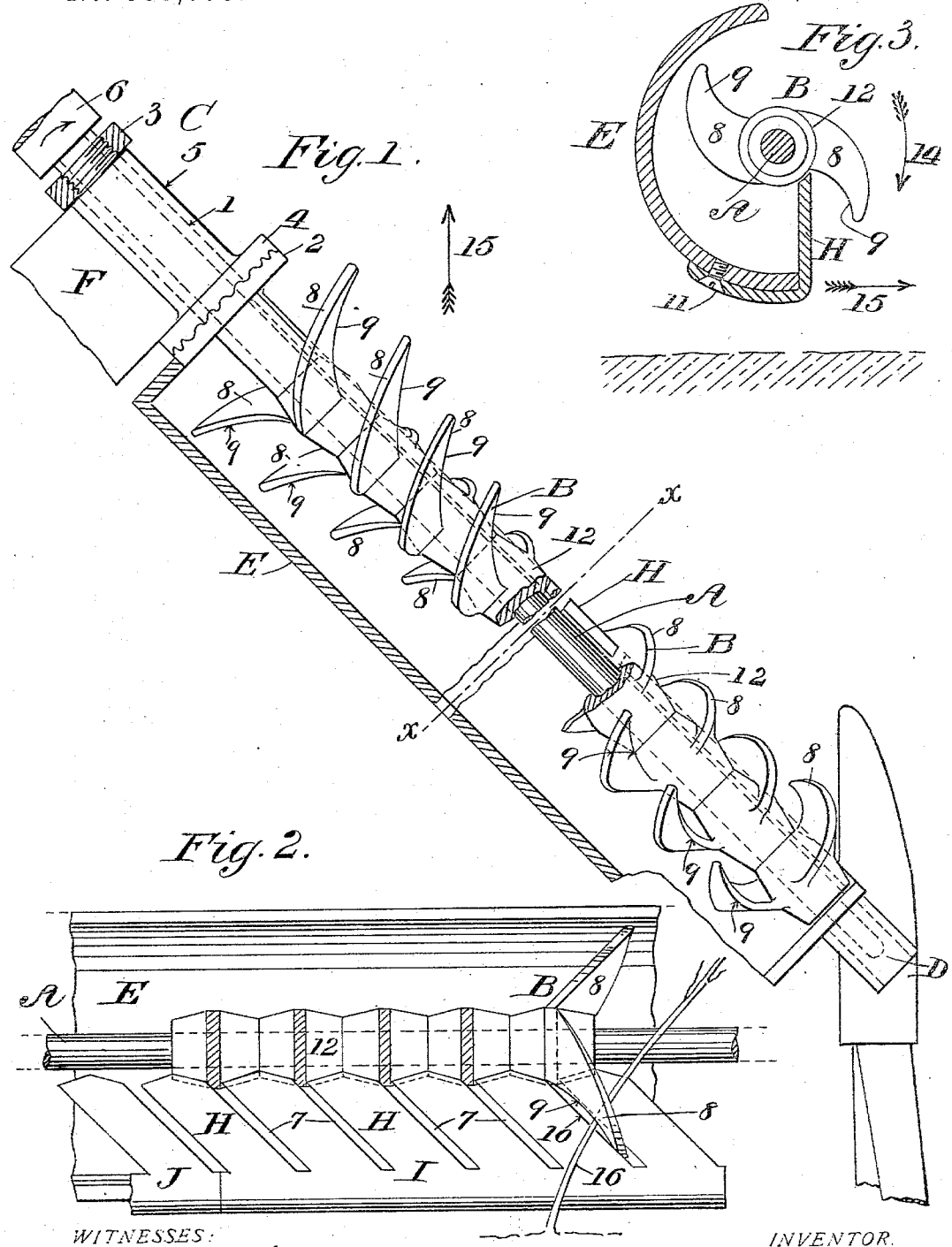

GERARD BEEKMAN, OF NEW YORK, N. Y.

REAPING OR MOWING MACHINE.

SPECIFICATION forming part of Letters Patent No. 553,095, dated January 14, 1896.

Application filed February 14, 1895. Serial No. 538,379. (No model.)

*To all whom it may concern:*

Be it known that I, GERARD BEEKMAN, a citizen of the United States, and a resident of New York city, in the county of New York and State of New York, have invented certain new and useful Improvements in Reaping or Mowing Machines, of which the following is a specification.

This invention relates to a character of rotary cutter similar to that described and claimed in my Letters Patent of the United States No. 490,781, granted January 31, 1893, and also described and claimed in my Letters Patent of the United States No. 535,883, granted March 19, 1895, and my said invention consists in certain new and useful improvements hereinafter fully described and claimed, which are designed to promote the successful operation of the machine.

Referring to the accompanying drawings, in which similar characters of reference designate corresponding parts in each of the views, Figure 1 is a plan view, partly broken away, showing a rotary cutting apparatus having its axis of rotation disposed obliquely to the direction of the draft of the machine to which it is attached and embodying my present invention. Fig. 2 is a front elevation, partly in section, of a portion of Fig. 1; and Fig. 3, a cross-section at $x$ $x$, Fig. 1. Fig. 4 is a cross-section at $y$ $y$, Fig. 5, showing a modification; and Fig. 5, a front elevation, partly in section, of Fig. 4.

The rotary shaft A, bearing the cutters B, is mounted in bearings C D on the extremities of the frame E. The frame E may be adjusted to some extent rotatively about the axis of the shaft A, and for this purpose said frame terminates at the end connected to the machine in a sleeve 1, having a flange 2 at one end and a nut 3 screw-threaded thereto at the other, adapted to draw up said sleeve and bind its said flange against the flange 4 upon the bushing 5 of the machine-frame F. By loosening the nut 3 the frame E may be set as desired and then firmly clamped by said nut. The shaft A passing through the sleeve 1 is connected to suitable rotary driving mechanism. (Represented at 6.) These adjusting devices are described and claimed in my aforesaid pending patent application.

Upon the frame E there are mounted stationary cutters H H, which stand in a common plane, forming a slotted wall through the slots 7 7, &c., of which the blades 8 of the rotary cutters B pass and sever the stalks of the grain or grass.

The cutting-edges of the rotary knives are at 9, and these shear on the cutting-edges of the plates H, which are at 10. The plates H are shown combined on sections I J, &c., Figs. 2 and 5, each section comprising several plates of the series in one piece attached by screws 11 or otherwise attached to the frame E, said sections being independently removable for convenience of repair. The plates H tangentially approach the hubs 12 of the rotary cutters, as seen in Figs. 3 and 4, and conform to the longitudinal contour of the same, as seen in Figs. 2 and 5, thereby acting as cleaners, which prevent accumulation of material around the shaft.

The invention may be adapted to rotary cutters having a down-cut, as in Figs. 1, 2, and 3, or it may be adapted to rotary cutters having an up-cut, as in Figs. 4 and 5. In the former instance the stationary cutters H are mounted below the rotary cutters B, being attached to the bottom of the frame E, as in Fig. 3, and in the latter instance the stationary cutters H are mounted above the rotary cutters B, being attached to the top of the frame E, as in Fig. 4. The frame E is herein shown as a shield, but may be otherwise variously constructed.

In the operation of the machine the hooked blades 8, of the obliquely-disposed rotary cutter-shaft A, rotating, for instance, in the direction of the arrow 14, Fig. 3, and advancing over the ground in the direction of the arrow 15, catch the grain or grass near the base, and shear the stalks in the manner hereinafter described. The rapid revolution of the shaft A, relative to the draft speed of the machine, insures cutting action on the stalks of grass or grain assembled in groups to facilitate the cutting by the curved cutting-edge 9 of the blade 8. The front wall H H, advancing obliquely against the grain or grass to be cut, tends to throw the grain or grass forward and outward with reference to the machine, and within the points of the revolving blades 8 8 of the cutter B. The grain or grass thus caught within the points of the cutting-blades 8 8 will be carried against and across the slot 7, as illustrated in Fig. 2, thereby insuring the cutting of the grain or grass between the edge 9 of the knife 8 and the edge 10 of the slot 7 of the plate H, at the same time insuring the cleaning of the blade 8 by its complete passage through slot 7, which should be sufficiently narrow to perform this function.

According to the nature of the material to be cut, the frame E may be adjusted to set the face of the plates H forward or back, also varying their angular position with reference to the ground.

This invention may be applied also to a machine having the shaft A arranged at right angles to the line of draft, as in my aforesaid patent.

Having thus fully described my invention, what I claim, and desire to secure by Letters Patent, is—

1. In a reaping or mowing machine, the combination with a series of rotary cutters on a substantially horizontal axis of rotation having cutting projections at oblique angles to said axis whereby they incline the grain or grass, of a series of stationary projections filling and conforming to the longitudinal profile of the intervening spaces of said rotary cutters.

2. In a reaping or mowing machine, the combination with a series of rotary cutters on a substantially horizontal axis of rotation having cutting projections at oblique angles to said axis whereby they incline the grain or grass, of a series of stationary knives having acting surfaces in a plane parallel with said axis and intersecting the orbits of said rotary cutters.

3. In a reaping or mowing machine, the combination with a series of rotary cutters on a substantially horizontal axis of rotation having cutting projections at oblique angles to said axis whereby they incline the grain or grass, of a series of stationary knives combining to form a slotted wall the acting surface of which is non-concentric with said axis.

4. In a reaping or mowing machine, the combination with a series of rotary cutters on a substantially horizontal axis of rotation, having cutting projections divergent from said axis, of a series of stationary projections having acting edges also divergent from said axis intervening said cutters and approaching the shaft thereof to serve as cleaners.

5. In a reaping or mowing machine, the combination with a series of rotary cutters on a substantially horizontal axis of rotation, having cutting blades divergent from said axis constructed in the form of conic spirals, of a series of stationary knives intervening said cutters combining to form a wall having slots inclined correspondingly to the taper of the cutters.

6. In a reaping or mowing machine, the combination with a series of rotary cutters on a substantially horizontal axis of rotation, having cutting blades divergent from said axis constructed in the form of conic spirals, of a series of stationary knives intervening said cutters combining to form a wall having slots inclined correspondingly to the taper of the cutters, means for advancing the cutting apparatus in a direction to which the said axis and wall are obliquely disposed; said slots and the cutters while entering the same, crossing the grain or grass when swept by the wall substantially as described.

Signed at New York city, in the county of New York and State of New York, this 12th day of February, A. D. 1895.

GERARD BEEKMAN.

Witnesses:
EUGENE LUCAS,
HENRY F. PARKER.